(12) United States Patent
El Marouani et al.

(10) Patent No.: US 10,581,836 B2
(45) Date of Patent: Mar. 3, 2020

(54) METHOD FOR ACCESSING A SERVICE AND A CORRESPONDING SERVER

(71) Applicant: GEMALTO SA, Meudon (FR)

(72) Inventors: Abdellah El Marouani, Gemenos (FR); Christophe Franchi, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 124 days.

(21) Appl. No.: 15/108,600

(22) PCT Filed: Dec. 19, 2014

(86) PCT No.: PCT/EP2014/078731
§ 371 (c)(1),
(2) Date: Jun. 28, 2016

(87) PCT Pub. No.: WO2015/101522
PCT Pub. Date: Jul. 9, 2015

(65) Prior Publication Data
US 2016/0330196 A1  Nov. 10, 2016

(30) Foreign Application Priority Data
Dec. 30, 2013  (EP) .................................. 13306888

(51) Int. Cl.
*H04L 29/08*  (2006.01)
*H04L 29/06*  (2006.01)
(Continued)

(52) U.S. Cl.
CPC .......... *H04L 63/0853* (2013.01); *G06F 21/57* (2013.01); *G06F 21/577* (2013.01);
(Continued)

(58) Field of Classification Search
CPC ............................ H04L 63/0853; G06F 21/57
(Continued)

(56) References Cited

U.S. PATENT DOCUMENTS 8,239,953 B1    8/2012  Satish et al.
2009/0178138 A1  7/2009  Weiss et al.
(Continued)

FOREIGN PATENT DOCUMENTS

WO   WO 2009/105540 A1   8/2009
WO   WO 2013/147891 A1   10/2013

OTHER PUBLICATIONS

International Search Report (PCT/ISA/210) dated Jan. 29, 2015, by the European Patent Office as the International Searching Authority for International Application No. PCT/EP2014/078731.

*Primary Examiner* — Anthony D Brown
(74) *Attorney, Agent, or Firm* — Buchanan Ingersoll & Rooney PC

(57) ABSTRACT

To a method for accessing a service, at least one first user device executes a first application that communicates with a second user device application. The first user device sends to a remote server data relating to the first application execution, as a first user device report. The data relating to the first application execution includes information relating to either an incoming event or an outgoing event and at least one attribute relating to the first application execution. The remote server determines, based upon at least the first user device report, a trust level relating to the first user device. A third user device sends to the remote server a request for getting a trust level relating to the first user device. The remote server sends to the third user device, as a request response, the trust level relating to the first user device.

10 Claims, 1 Drawing Sheet

(51) Int. Cl.
*G06F 21/57* (2013.01)
*H04W 12/06* (2009.01)

(52) U.S. Cl.
CPC ........ *H04L 63/0876* (2013.01); *H04L 63/102* (2013.01); *H04L 67/22* (2013.01); *H04W 12/06* (2013.01); *G06F 2221/2101* (2013.01)

(58) Field of Classification Search
USPC .......................................................... 726/7
See application file for complete search history.

(56) References Cited

U.S. PATENT DOCUMENTS

| | | |
|---|---|---|
| 2009/0235334 A1 | 9/2009 | Park |
| 2010/0100939 A1 | 4/2010 | Mahaffey et al. |
| 2011/0148933 A1* | 6/2011 | Murakami ............ G06F 3/0481 345/660 |
| 2012/0054847 A1* | 3/2012 | Schultz et al. ............ G06F 1/00 726/9 |
| 2014/0201841 A1 | 7/2014 | Deshpande et al. |
| 2015/0113057 A1* | 4/2015 | Carricarte ............. H04W 4/206 709/204 |
| 2015/0178750 A1* | 6/2015 | Robinson ........... G06Q 30/0268 705/7.34 |
| 2015/0199010 A1* | 7/2015 | Coleman et al. ....... G06F 3/015 726/2 |

\* cited by examiner

METHOD FOR ACCESSING A SERVICE AND A CORRESPONDING SERVER

FIELD OF THE INVENTION

The invention relates generally to a method for accessing a service.

Moreover, the invention also pertains to a server for accessing a service.

STATE OF THE ART

Nowadays, there are more and more communicating devices, such as mobile (tele)phones, tablets, Personal Computers (or PCs), portable PCs, Personal Digital Assistants (or PDA), or other user terminals that are connected to a mobile radio-communication network or an Internet type network. Thus, such connected people are carrying out communications easier with each other through voice calls, visual and audio calls, exchanged text messages, via emails or Short Message Service (or SMS) type messages, or the like.

However, when a user of a mobile phone, as a device, wants to communicate with or carry out a transaction with another device user, the device user desires to know whether she/he may trust or not the other device user prior to exchanging with this latter.

Thus, the device user does not become a victim of a theft, as the other device user and interlocutor.

There is a need to provide a solution that allows knowing whether a possible interlocutor device user may be trustable or not.

SUMMARY OF THE INVENTION

The invention proposes a solution for solving the just herein above specified need by providing a method for accessing a service.

According to the invention, at least one first user device executes a first application that communicates with a second user device application. The first user device sends to a remote server data relating to the first application execution, as a first user device report. The remote server determines, based upon at least the first user device report, a trust level relating to the first user device. A third user device sends to the remote server a request for getting a trust level relating to the first user device. The remote server sends to the third user device, as a request response, the trust level relating to the first user device.

The principle of the invention consists in that a remote server collects information relating to each first user device application that communicates with a second user device application and determines, by using the collected information, as a first user device report, a first user device confidence (or trust) level. Then, the remote server transmits the first user device trust level upon a request originating from a third device.

The remote server tracks thus an activity relating to one or several communication applications executed at a first device side.

It is to be noted that, within the present description, a transaction application is a particular communication application.

The invention solution allows a third device user who wants to communicate with the first device to learn, as requester of a trust level relating to a first device, more about a first device user, as her/his potential interlocutor.

The third device user may thus form a positive opinion about the first device user who is trustworthy when the first device trust level is greater than a predefined threshold.

It is to be noted that the third device may be the second device. In other words, the third device may have communicated with the first device and a corresponding first device report and/or a corresponding third device report may have been sent from the first device and/or the third device respectively.

According to a further aspect, the invention is a server for accessing a service. According to the invention, the server is configured to receive data relating to a first application execution, as a first user device report. The server is configured to determine, based upon at least the first user device report, a trust level relating to a first user device. The server is configured to receive a request for getting a trust level relating to the first user device, and to send, as a request response, the trust level relating to the first user device.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

Herein under is considered a case in which the invention method for accessing a service is implemented by a remote server and a mobile phone, as a first device, that includes an embedded chip.

According to another embodiment, the invention method for accessing a service is implemented by a remote server and a mobile phone, as first device and standalone entity. In other words, the mobile phone, as a user terminal, (and more exactly the phone microprocessor) does not cooperate with any chip, so as to send to the remote server information relating to any phone communication activity. According to such an embodiment (not represented), the first device is adapted to carry out the functions that are carried out by the chip and the first device and that are described infra.

Naturally, the herein below described embodiment is only for exemplifying purposes and is not considered to reduce the scope of the invention.

Figure 1:
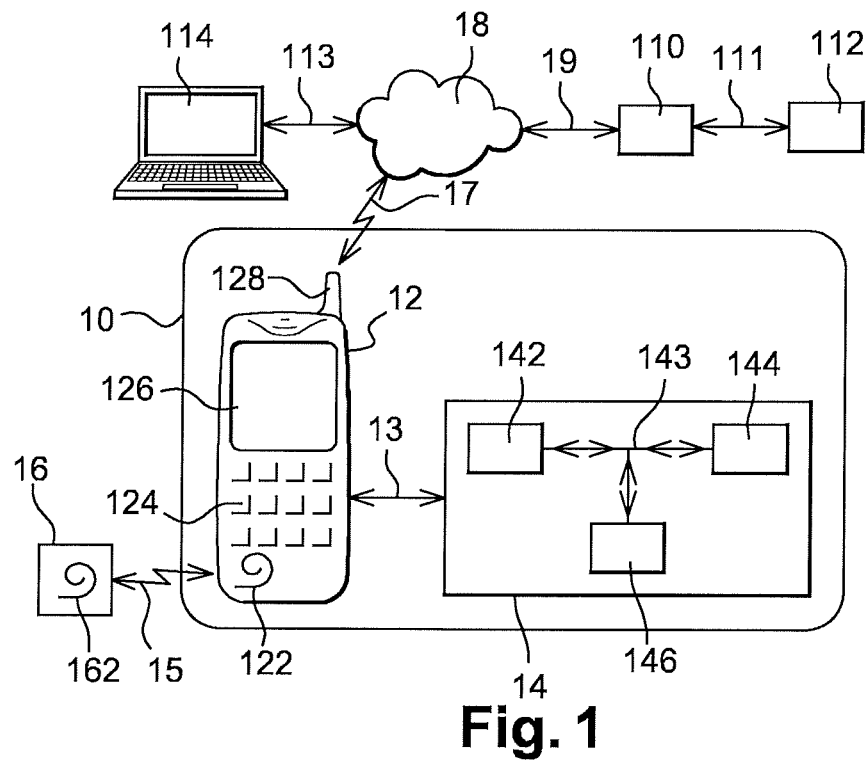
FIG. 1 illustrates a simplified diagram of a remote server that is connected to a a terminal and a mobile phone including a chip, the remote server being arranged to receive information relating to a phone communication activity, to determine a trust level relating to the phone and to send, upon request, to the terminal the phone trust level, according to the invention.

FIG. 1 shows schematically a mobile equipment 10, as a terminal of a user, and a terminal 114, as a terminal of another user, that are both connected to a remote server 110.

The mobile equipment 10 includes a mobile phone 12, as a user terminal, and an embedded Universal Integrated Circuit Card (or eUICC) 14, as an embedded chip coupled to the mobile phone 12.

Instead of being embedded, the chip may be included within a smart card termed Subscriber Identity Module (or SIM) type card or the like, as a Secure Element (or SE).

The invention does not impose any constraint as to a kind of the SE type. As a removable SE, it may be a SIM type card, a Secure Removable Module (or SRM), a smart dongle of the USB (acronym for "Universal Serial Bus") type, a (micro-) Secure Digital (or SD) type card or a Multi-Media type Card (or MMC) or any format card to be coupled to a host device, as first device.

Within the present description, a Secure Element (or SE) is a smart object that, on the one hand, protects access to data that the smart object stores and, on the other hand, is intended to communicate with the outside world.

For sake of simplicity, the mobile phone 12, the eUICC 14, another user terminal 114 and the remote server 110 are termed herein after the phone 12, the chip 14, the PC 114 and the server 110 respectively.

Only one phone 12 and one PC 114 that are connected to the server 110 are represented for clarity reason. However, the server 110 is able to be accessed from and access, Over-The-Air (or OTA), Over-The-Internet (or OTI), or Over The Cloud (or OTC), a fleet of connected terminals.

Instead of a phone, it may be any other device including means for processing data, comprising or being connected to wireless communication means for exchanging data with outside, and comprising or being connected to means for storing data.

Within the present description, the adjective "wireless" denotes notably that the communication means communicates via one or several Long Range (or LR) Radio-Frequency (or RF) links.

The LR RF may be fixed at several hundreds of MHz, e.g., around 850, 900, 1800, 1900 and/or 2100 MHz.

The phone 12 is used for accessing one or several mobile radio-communication networks.

The mobile radio-communication network(s) may be constituted by a Global Service for Mobiles (or GSM), a General Packet Radio Service (or GPRS), a Universal Mobile Telecommunications System (or UMTS), a UTRAN (acronym for "UMTS Terrestrial Radio Access Network"), an EDGE (acronym for "Enhanced Data Rates for GSM Evolution"), a Code Division Multiple Access (or CDMA), a WLAN (acronym for "Wide Local Area Network") and/or a Long Term Evolution (or LTE) type network(s).

Such a mobile radio-communication network set is not exhaustive but only for exemplifying purposes.

The mobile radio-communication network(s) (not represented) is(are) included within a network 18 that is connected to the server 110.

The network 18 comprises or is connected to an Internet type network (not represented).

The phone 12 is Near Field Communication (or NFC) enabled and, as such, is able to communicate with a Contact-Less (or CL) device 16.

The NFC communication technology is included within a CL communication technology, as proximity communication technology.

The CL device 16 may be a Radio Frequency IDentification (or RFID) tag to be read, a CL reader or the like.

The CL device 16 may be connected to a communication network, as a backend system (not represented) and an NFC infrastructure.

The CL device 16 includes an antenna 162 for communicating, over a Short Range (or SR) RF link 15, with an external device, like the phone 12, as user terminal.

The antenna 162 is able to receive data from and send data to outside, through the SR RF link 15.

The CL device 16 is present at a geographical location at which one or several CL applications or services may be accessed.

As to the phone 12, it may be any device including means for processing data, comprising or being connected to a first antenna 122 for sending to and/or receiving data from outside, comprising or being connected to means for interfacing with a user, as Man Machine Interface (or MMI), like a keyboard 124, a loudspeaker (not represented) and/or a display screen 126, comprising or being connected to means for storing data, and comprising or being connected to a second antenna 128 for sending to and/or receiving data from outside.

The phone 12 includes a battery (not represented), one or several microprocessors (not represented), as data processing means, one or several memories (not represented), data storing means, and two or more I/O interfaces.

The first antenna 122 allows exchanging, via an NFC chip (not represented), through the SR RF link 15, with an external CL entity(ies) data transported by an SR RF signal.

The SR RF link 15 is also termed CL link and allows communicating data in a close manner, i.e. up to 20 cm.

The frequency of the SR RF link 15 may be fixed at, e.g., 13.56 MHz.

The SR RF is related to a Contact-Less communication technology, as proximity communication technology.

The NFC chip includes, in particular, a microprocessor(s) (not represented), as means for processing data, one memory(ies) (not represented), as means for storing data, and at least one Input/Output (or I/O) interface (not represented) for exchanging data with the outside world, which are internally linked together through a data and control bus (not represented).

The NFC chip, or termed Contact-Less Front end (or CLF) chip, is incorporated within the phone 12.

According to an alternative embodiment (not represented), the NFC chip is incorporated within a separate SE that is coupled to the phone and interacts with the phone.

The NFC chip is soldered on a Printed Circuit Board (or PCB) of the phone 12. The NFC chip is connected to the phone microprocessor and the first antenna 122 configured to exchange data, through an SR RF signal, with an external CL communicating device.

The NFC chip is connected either directly or, through a phone I/O interface, to the chip 14.

The NFC chip plays a role of a modulator-demodulator (or modem) for the chip 14, i.e. a device that:

demodulates a received analogical carrier signal to decode encoded digital information that is received, over the first antenna 122, from an external CL entity and to be transmitted to the chip 14, and modulates an analogical carrier signal to encode digital information received from the chip 14 and to be transmitted, over the first antenna 122, to an external CL entity.

In a reader mode, i.e. when the phone 12 battery powers an external CL device 16, the NFC chip receives power from the phone 12 battery and powers the CL device by broadcasting an SR RF signal. The chip 14 and the electronic components of the phone 12 are powered by the phone 12 battery.

In a card emulation mode (or transponder mode), i.e. when the chip 14 is powered at least in part by an external CL device 16, the NFC chip receives power from the CL device 16 and provides power to the chip 14 and the phone 12 components. The chip 14 is thus powered even if the phone battery is off.

In the reader mode and in the card emulation mode, the NFC chip communicates with the chip 14, as its interlocutor.

The NFC chip and the chip 14 may exchange data by implementing a protocol of the Single Wire Protocol (or SWP) type, as low level protocol.

The NFC chip may exchange with the chip 14 by implementing a protocol of the Host Controller Interface (or HCI) type, as high level protocol, i.e. a protocol used for exchanging from an application run by the NFC chip microprocessor to an application run by a chip microprocessor 142.

The phone microprocessor processes data originating from either the phone memory or an external entity. The phone microprocessor executes one or several applications, so as to interact with an application that is supported by the chip 14 and offered to the phone user.

The phone memory(ies) may comprise one or several volatile memories and one and/or several non-volatile memories.

The phone memory stores data, like user data.

The phone memory stores an Operating System (or OS) and one or several applications to be executed by the phone microprocessor.

As applications, there is at least one communication application for communicating with an external user device, like a phone call application, a SMS type message communication application, an email type message communication application, an Internet payment application and/or the like.

Each of the communication applications supported by the phone 12 is surveyed by an application supported by the phone 12, as a companion application of an invention application for surveying a user communication activity that is supported by the chip 14 and described infra.

To survey each of the communication applications that is supported by the phone 12, the companion application is awaken every time an incoming event or outgoing event occurs while getting data relating to the concerned communication application execution. More exactly, the companion application is awaken every time that:
- a phone call is incoming or outgoing for the phone call application;
- an SMS type message is received or sent for the SMS type message communication application;
- an email type message is received or sent for the email type message communication application;
- an Internet payment is received or sent for Internet payment application.

The companion application is adapted to transmit to the invention application supported by the chip 14, every time an incoming event or outgoing event occurs, data relating to a concerned communication application that is executed by the phone 12 and retrieved from the concerned communication application.

As applications supported by the phone 12, there is also preferably at least one menu or a Web browser, as user interface for accessing one or several applications supported by the chip 14, like one or several communication applications that use a CL communication technology. A chip 14 application allows communicating or exchanging data, over a CL link, over the first antenna 122, in a close manner, between e.g. the proximal CL device 16, the chip 14 and a phone user.

The phone 12 may be used for letting communicate, through the NFC chip, in a close manner, the chip 14 and the proximal CL device 16.

The phone MMI allows a phone user to interact with the phone 12 or the chip 14.

The second antenna 128 allows communicating data, through an LR RF link 17, with one or several mobile radio-communication networks that are connected to the server 110 and any other entity, like the PC 114.

The phone 12 plays, in a preferential manner, a role of a modulator-demodulator (or modem) notably for the chip 14.

The phone 12 carries out the following operations:
- a modulation of an analogical carrier signal to encode digital information to be transmitted, over the second antenna 128, to the server 110 and/or another entity, like the PC 114, and
- a demodulation of a received analogical carrier signal to decode the encoded digital information that is received, over the second antenna 128, from the server 110 and/or another entity, like the PC 114.

The phone 12 is thus able to exchange data, in a distant manner, with the server 110 or an entity, like another mobile phone or the PC 114, that is connected to a mobile radio-communication network and/or the network 18.

The phone 12, as chip 14 host device, is preferably coupled or connected to the chip 14.

The phone I/O interfaces include one or several I/O interfaces for exchanging data with the chip 14.

The chip 14 is under control of the phone microprocessor.

Alternately, instead of being coupled to the chip 14, the phone memory(ies) stores data stored within the chip 14 as described infra.

According to a particular embodiment, the chip 14 is soldered to a Printed Circuit Board (or PCB) of the phone 12.

According to another embodiment, the phone I/O interface with the chip 14 is an International Organization for Standardization (or ISO) 7816 interface, as contact interface, when the chip 14 is inserted, in a removable manner, within the phone 12.

Alternately, instead of a contact interface, the phone I/O interface with the chip 14 is connected to or includes a CL interface. The phone 12 is connected to or includes means for communicating data while using preferably an SR RF link. The SR RF link may be related to any technology that allows the phone 12 to exchange data, through a CL link, with the chip 14. The SR RF may be related to an NFC type communication technology.

The chip 14 belongs to a user, as subscriber to a wireless service(s) and preferably user of CL service(s).

The chip 14 is connected, through a bi-directional link 13, to the phone 12.

The chip 14 includes a microprocessor(s) 142, as data processing means, a memory(ies) 144, as data storing means, and one or several I/O interfaces 146 that are internally all connected, through an internal bidirectional data bus 143, to each other.

The I/O interface(s) 146 allow(s) communicating data from the internal chip components to the chip exterior and conversely.

The microprocessor 142 processes, controls and communicates internally data with all the other components incorporated within the chip and, through the I/O interface(s) 146, with the chip exterior.

The microprocessor 142 executes or runs one or several applications.

As applications, there is at least one communication application for communicating with an external user device, such as an NFC e-government type application(s), an NFC banking/finance type application(s), an NFC mobile communication type application(s), an NFC loyalty type application(s), an NFC ticketing type application(s), an NFC transportation type application(s), an NFC payment type application(s) and/or an NFC information type application(s) and/or other CL communication application(s).

Among the applications supported by the chip 14, there is an invention application for surveying a user communication activity, namely any incoming event or any outgoing event originating either from the phone 12 when the concerned communication application is executed by the phone 12 or the chip 14 when the concerned communication application is executed by the chip 14.

The invention application for surveying a user communication activity allows application collecting data relating to any surveyed application execution, as first application execution. The surveyed application is used for communicating with another external device, irrespective of whether the surveyed communication application is executed by either the phone 12 or the chip 14.

Each of the communication applications supported by the chip 14 is surveyed by an invention application supported by the chip 14.

To survey each of the communication applications supported by the phone 12 or the chip 14, the invention application is awaken every time an incoming event or outgoing event occurs while getting data relating to the concerned communication application execution.

To survey an incoming event or outgoing event at the phone 12 side, the invention application supported by the chip 14 is notified by the companion application supported by the phone 12 when a corresponding command is received by the concerned communication application that is executed by the phone 12.

For instance, the invention application supported by the chip 14 is notified by the companion application executed by the phone 12 every time a call set-up request is received by the phone call application when the invention application supported by the chip 14 is registered to the "EVENT_EVENT_DOWNLOAD_MT_CALL" event in which MT is used for "Mobile Terminated".

For instance, the invention application supported by the chip 14 is notified by the companion application executed by the phone 12 every time an SMS type message is going to be updated in the short message file of the chip 14 by the SMS type message communication application when the invention application supported by the chip 14 is registered to the "EVENT_UNFORMATTED_SMS_PP_UPD" event in which PP is used for "Point-to-Point" and UPD is used "UPDated".

To survey an incoming event or outgoing event at the chip 14 side, the invention application supported by the chip 14 is notified directly, i.e. without any intermediary application like a companion application, every time a corresponding command is received by the concerned communication application that is executed by the chip 14.

When the communication application is supported by the chip 14, the invention application is awaken every time that an incoming or outgoing event occurs while getting data relating to the concerned communication application execution.

For instance, for an NFC payment type application supported by the chip 14, the invention application is awaken when an NFC payment occurs while getting data relating to the concerned NFC payment execution.

The surveyed application, as first application, irrespective of whether the concerned communication application is executed by either the phone 12 or the chip 14 transmits directly or indirectly, i.e. through the intermediary companion application, to the invention application data relating to the surveyed application (or communication application) execution.

As data relating to a communication application execution, there is at least one attribute.

As attribute(s) relating to a communication application execution, it may include a data communication technology type, a communication application type, a user role type, a date and time of the phone communication application execution, a location relating to the phone 12 when the phone 12 executes the phone communication application, an identifier relating to the phone 12 and/or an identifier relating to the chip 14.

As data communication technology type, it may include a CL communication technology, a wireless communication technology and/or an Internet type communication technology with or without a user authentication.

As a communication application type, the communication (or first) application may be a secure application or a non-secure application. The secure application, when executed, authenticates successfully the first application user.

As (phone 12 or chip 14) user role type, it may include a role that is linked to the user application in which the user, as a debtor, gives money to her/his interlocutor, in which the user, as a creditor, receives money from her/his interlocutor, in which the user, as a transmitter of data, transmits data to her/his interlocutor, in which the user, as a mutual data sharing person, shares data with her/his interlocutor or in which the user, as a receiver of data, receives data from her/his interlocutor.

The invention application for surveying a user communication activity allows thus surveying or listening a set of communication applications while requesting, each, when a corresponding incoming or outgoing event occurs to be informed of an occurrence of the concerned event preferably along with one or several attributes relating to the concerned communication application, when executed.

The invention application for surveying a user communication activity also allows sending to the server 110 data relating to the communication application execution that is collected from the concerned communication application.

The microprocessor 142 is preferably able to initiate actions, in order to interact directly with the outside world, in an independent manner of the phone 12, as a chip host device. Such a capacity of interaction at the initiative of the chip 14 is also known as proactive capacity. According to one preferred embodiment, the chip 14 is able to use SIM ToolKit (or STK) type commands, as proactive commands.

The chip 14 is thus able to send, at its own initiative, through the phone 12, to any device connected to the phone 12 a proactive command for sending to the server 110 a message, like a HyperText Transfer Protocol (or HTTP) type message, that includes a request for uploading data relating to any supported application.

The microprocessor 142 executes, in a preferred manner, one or several security functions.

The security functions include preferably a user authentication process to be used prior to continuing an execution of a communication application that may be executed by either the phone 12 or the chip 14. To authenticate the user, the user has to provide a Personal Identity Number (or PIN) or biometric data, as user reference data, that is stored within the memory 144. As biometric data, it may include one or several fingerprints, one or several iris prints, one or several voiceprints relating to one or several authorized users.

The memory 144 stores data relating to one or several subscriptions to several mobile radio-communication networks, as wireless services.

Data relating to one subscription to one mobile radio-communication network includes:
- an International Mobile Subscriber Identity (or IMSI), as subscriber and service subscription identifier for accessing a mobile radio-communication network;
- a key Ki, as network authentication key, allowing to authenticate the concerned subscriber to the concerned mobile radio-communication network;
- Milenage, as authentication algorithm, allowing to authenticate the concerned subscriber to the concerned mobile radio-communication network;
- one or several passwords, like a PIN, and/or one or several cryptographic algorithm(s), as data relating to secret(s), that is(are) securely stored within the chip 14;
- a file system including one or several Elementary Files (or EF);
- one or several security keys, like a key(s) for encrypting/decrypting data and/or a key(s) for signing data a key(s);
- one or several applicative keys, like a key for accessing a user bank account through the mobile radio-communication network; and/or
- one or several credentials, like a user name and/or IDentifier (or ID) of the subscriber, as data relating to the user.

The memory 144 stores an OS.

The memory 144 stores preferably one or several Subscriber Identity Module (or SIM) type applications.

The SIM type application(s) includes, among others, a SIM application for a Global Service for Mobiles (or GSM) type network, a Universal Subscriber Identity Module (or USIM) application for a Universal Mobile Telecommunications System (or UMTS) type network, a Code Division Multiple Access (or CDMA) Subscriber Identity Module (or CSIM) application and/or an Internet protocol Multimedia Subsystem (or IMS) Subscriber Identity Module (or ISIM) application.

The SIM type application(s) allow(s) the phone 12 to identify and authenticate to one or several mobile radio-communication networks 16.

The memory 144 stores one or several applications that the microprocessor 142 executes. Among the supported applications, the memory 144 stores the invention application for surveying a user communication activity. The memory 144 stores preferably one or several communication applications, like an NFC payment application.

The memory 144 stores preferably data relating to a Uniform Resource Identifier (or URI), a Uniform Resource Locator (or URL) and/or an Internet Protocol (or IP) address of an external entity to be addressed, like the server 110 or a PC 114, as an interlocutor device.

The server 110 is connected, through a bi-directional link 19, to the network 18.

The server 110 is identified by a URI, like an URL, an IP address or the like, as server identifier.

The server identifier may be stored within the chip memory 144 or a phone memory.

The server 110 may be operated by a mobile radio-communication network operator, as an MNO or a Mobile Virtual Network Operator (or MVNO), a service provider or on its behalf.

The server 110 is hosted by a computer.

The server 110 includes a microprocessor(s) (not represented), as data processing means, comprises and/or is connected to a memory(ies), as data storing means, and one or several I/O interfaces (not represented).

The server 110 is dedicated to running an application for managing a database and communicating data of the database to outside.

Alternately, another server (not represented) that is connected to the server 110 manages the database.

The server 110 is connected, over a bi-directional link 111, to a memory 112 that stores the database.

Instead of an external memory, the server 110 includes an internal memory (not represented) storing the database.

The database includes a set of one or several identifiers relating, each, to an individual client device that is, each, associated with a trust level that is determined as specified infra.

The server 110 is adapted to receive from any user device, as client device, data relating to a communication application execution, as a user device report. The client device is used by a user who intends to be recognized preferably as a trustable person.

According to an essential invention feature, the server 110 is adapted to determine, based on one or several user device reports, a trust level relating to a user device.

To determine the trust level relating to a user device, the server 110 allocates a predetermined weight factor to one or several attributes relating to each communication application execution.

The server 110 is preferably adapted to prioritize at least one security attribute relating to one or several communication application executions.

As attribute(s) relating to a communication application execution, it may include a data communication technology type, a communication application type, a user role type, a date and time of the phone communication application execution, a location relating to the phone 12 when the phone 12 executes the phone communication application, an identifier relating to the phone 12 and/or an identifier relating to the chip 14.

For instance, the server 110 gives a priority level in a descending order of the herein above stated attribute list, i.e. a highest priority at the first one and a lowest priority at the last one while setting a corresponding highest weight value to the data communication technology type and a corresponding lowest weight value to the device type.

As data communication technology type, it may include a CL communication technology, a wireless communication technology and/or an Internet type communication technology with or without a user authentication.

For instance, the server 110 gives a priority level in a descending order of the herein above stated data communication technology list, i.e. a highest priority at the first one and a lowest priority at the last one while setting a corresponding highest weight value to the CL communication technology, as a secure proximity technology and a corresponding lowest weight value to the Internet type communication technology without a user authentication, as a non-secure and non-proximity technology.

As a communication application type, the communication application may be a secure application or a non-secure application. The secure application, when executed, authenticates successfully the first application user.

For instance, the server 110 gives a priority level in a descending order of the herein above stated communication application list, i.e. a highest priority at the first one and a lowest priority at the last one while setting a corresponding highest weight value to the secure application and a corresponding lowest weight value to the non-secure application.

As user role type, it may include a role in which the user, as a debtor, gives money to her/his interlocutor, in which the user, as a creditor, receives money from her/his interlocutor, in which the user, as a transmitter of data, transmits data to her/his interlocutor, in which the user, as a mutual data sharing person, shares data with her/his interlocutor or in which the user, as a receiver of data, receives data from her/his interlocutor.

For instance, the server 110 gives a priority level in a descending order of the herein above stated user role list, i.e. a highest priority at the first one and a lowest priority at the last one while setting a corresponding highest weight value to the debtor and a corresponding lowest weight value to the receiver of data.

The server 110 determines a trust level relating to a user device by using all the data relating to one or several executions of one or several communication applications supported at a device side.

The server 110 establishes preferably a graduated trust level, like a score out of 100, as highest trust level value. If the trust level relating to a device exceeds a predetermined threshold, e.g. 50/100, then at least one user device may be considered as being trustable.

The server 110 tracks thus an activity relating to one or several communication applications supported at a device side.

The server 110 is adapted to receive (from a device) a request for getting a trust level relating to an identified user device.

The server 110 is also adapted to send (to the requesting device) the trust level relating to the identified user device, as request response.

If the identified user device has previously sent to the server 110, at least once, data relating to a communication application execution, then the server 110 sends to the requesting user device the trust level relating to the identified user device.

If the identified user device has not previously sent to the server 110 data relating to a communication application execution, then the server 110 may send to the requesting user device a message of the type either "the identified user device is not registered" or "the trust level is zero", as a predetermined default value.

The PC 114, as user terminal, is connected, through a bidirectional link, to the network 18.

Instead of a PC, the user terminal may be any other user device including means for processing data, comprising or being connected to communication means for exchanging data with outside, and comprising or being connected to means for storing data.

The PC 114 is a computer.

The PC 114 is able to communicate with the server 110.

The PC 114 is also able to communicate with another device, like a user terminal, like the phone 12.

Figure 2:
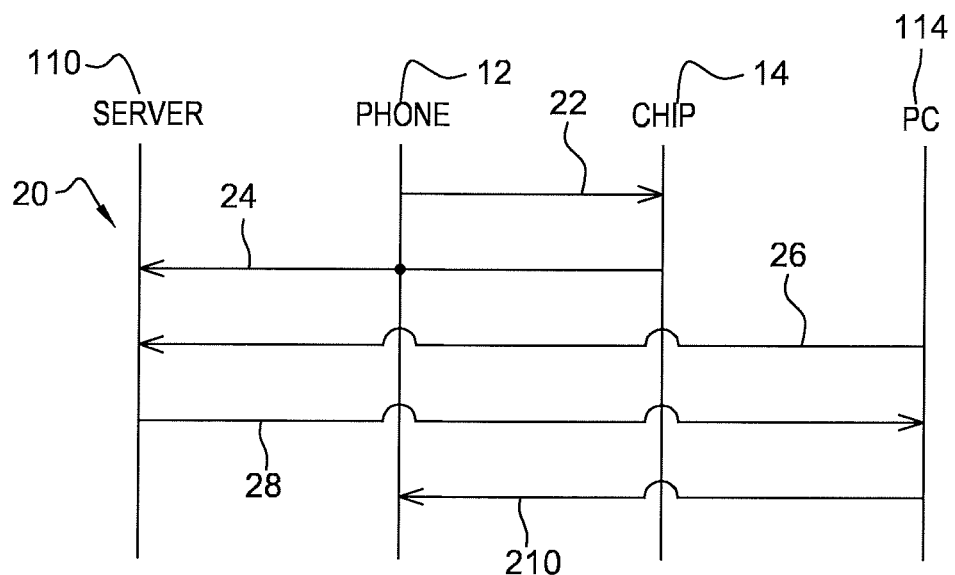
FIG. 2 represents an example of one message flow between the remote server, the chip and the terminal of FIG. 1, so that the terminal user decides whether she/he does (or does not) initiate an exchange with the phone user, thanks to the phone trust level received from the remote server.

FIG. 2 depicts an exemplary embodiment of a message flow 20 that involves the phone 12, the chip 14, the server 110 and the PC 114.

In the explained example, it is assumed that the phone 12 user has received an SMS by using her/his phone 12 and a SMS message communication application executed by the phone 12, as first user device.

The phone 12 sends to the chip 14 a message 22 including a command for invoking the application for surveying a user communication activity accompanied with data relating to an execution of the SMS message communication application. Such a command allows launching an execution of the application for surveying a user communication activity. The data relating to an execution of the SMS message communication application includes an identifier, such as a phone number, relating to an SMS message sending device, as second user device.

The chip 14 executes the application for surveying a user communication activity.

The chip 14 collects the data relating to an execution of the SMS message communication application that the phone 12 has executed.

Then, the chip 14 sends to the server 110 a message 24 including, besides an identifier relating to the chip 14, the data, as a phone report, relating to an execution of the SMS message communication application that the phone 12 has executed.

The server 110 determines, based on the phone report, a trust level relating to the phone 12.

The PC 114 user wants to communicate with the phone 12 user.

The PC 114, as third user device, sends to the server 110 a request 26 for getting a trust level relating to the phone 12.

The server 110 retrieves the trust level relating to the phone 12 that has been previously determined and stored at the server side.

The server 110 sends to the PC 114 a message 28 including, as request response, the trust level relating to the phone 12.

Once the PC 114 receives the trust level relating to the phone 12, the PC user verifies whether a communication with the phone user is trustable by using at least the trust level relating to the phone 12.

If the trust level relating to the phone 12 does not exceed a predetermined threshold, then the PC user may either abort her/his intention to communicate with the phone 12 user or define a data communication technology which the PC user shall use or prioritizes, so as to communicate with the phone 12.

Otherwise, i.e. when the trust level relating to the phone 12 exceeds a predetermined threshold, the PC user initiates a communication with the phone 12. Then, the PC 114 sends to the phone 12 a message 210, like an email type message, including, besides an identifier relating to the PC 114, a text.

The invention allows a device user who wants to communicate with another device user to know whether her/his potential interlocutor is (or not) trustable.

The invention is therefore convenient for a device user, as trust level requester.

The embodiment that has just been described is not intended to limit the scope of the concerned invention. Other embodiments may be given. As another embodiment example, instead of exchanging with a remote server, the user devices exchange, over a CL link, with a local entity, like a local server.

The invention claimed is:

1. A method for accessing a service providing at least one user device trust level, comprising:
   executing, by at least one first user device, a first application that communicates with a second user device;
   receiving, from the first user device, by a remote server, user communication activity data relating to the first application execution, as a first user device report, the user communication activity data relating to the first application execution including information relating to either an incoming event or an outgoing event and at least one attribute relating to the first application execution, the at least one attribute relating to the first application execution including a data communication technology type;

tracking, by the remote server, an activity relating to at least the first application executed by the at least one first user device;

determining, by the remote server, based upon at least the first user device report, a trust level relating to the first user device;

receiving, from a third user device, by the remote server, a request for getting a trust level relating to the first user device; and sending, from the remote server to the third user device, as a request response, the trust level relating to the first user device.

2. The method according to claim 1, wherein, to determine the trust level relating to the first user device, the remote server allocates a predetermined weight factor relating to the at least one attribute relating to the first application execution.

3. The method according to claim 2, wherein the at least one attribute relating to the first application execution further includes at least one element of the following group:
   a first application type;
   a first user device user role type;
   a frequency of the first application execution;
   a location relating to the first user device when the first user device executes the first application; and
   a first user device type.

4. The method according to claim 1, wherein the data communication technology type includes at least one element of the following group:
   a contact-less communication technology, as a proximity communication technology;
   a wireless communication technology; and
   an Internet type communication technology with or without a user authentication.

5. The method according to claim 3, wherein the first application type includes at least one element of the following group:
   a secure application, the secure application authenticating successfully the first application user; and
   a non-secure application.

6. The method according to claim 3, wherein the first user device user role type includes at least one element of the following group:
   a debtor;
   a creditor;
   a transmitter of data;
   a mutual data sharing person; and
   a receiver of data.

7. The method according to claim 1, wherein, prior to possibly sending data to the first user device, the third user device user verifies whether a communication with the first user device user is trustable by using at least the trust level relating to the first user device.

8. The method according to claim 7, wherein the method further comprises a step by which the third device user initiates, if the trust level relating to the first device exceeds a predetermined threshold, a communication with the first device.

9. The method according to claim 1, wherein the first user device cooperates with a secure element.

10. A server for accessing a service providing at least one user device trust level,
   wherein the server is configured to:
   receive user communication activity data relating to a first application execution, as a first user device report, the user communication activity data relating to the first application execution including information relating to either an incoming event or an outgoing event and at least one attribute relating to the first application execution, the at least one attribute relating to the first application execution including a data communication technology type, the server tracking an activity relating to at least the first application executed by at least one first user device;
   determine, based upon at least the first user device report, a trust level relating to a first user device;
   receive a request for getting a trust level relating to the first user device; and
   send, as a request response, the trust level relating to the first user device.

* * * * *